United States Patent [19]

Cox et al.

[11] 3,853,670
[45] Dec. 10, 1974

[54] PALLET MANUFACTURING MACHINE

[75] Inventors: Thomas L. Cox, Beaumont; David G. Rodriquez, Vidor, both of Tex.

[73] Assignee: J & J Manufacturing Company, Beaumont, Tex.

[22] Filed: Nov. 17, 1972

[21] Appl. No.: 307,491

[52] U.S. Cl................ 156/562, 156/300, 156/566, 156/572, 156/578
[51] Int. Cl............................................. B32b 31/00
[58] Field of Search ........... 156/300, 580, 565, 510, 156/559, 562, 572, 556, 538, 560, 566, 578; 108/51; 100/50, 216, 261; 144/317

[56] References Cited
UNITED STATES PATENTS

| | | | |
|---|---|---|---|
| 3,330,715 | 7/1967 | Terzuoli | 156/572 |
| 3,444,027 | 5/1969 | Smith et al. | 156/357 |
| 3,513,053 | 5/1970 | Sullivan | 156/562 |

*Primary Examiner*—Charles E. Van Horn
*Assistant Examiner*—Michael DuBall

[57] ABSTRACT

A machine for manufacturing disposable recyclable pallets according to the present invention comprises a machine framework adapted for supporting a stack of pallet sheets composed of a recyclable material and for supporting a plurality of stacks of pallet blocks which may be composed of wood or other recyclable material. The machine also includes an adhesive system providing adhesive material that is utilized to secure the pallet blocks in assembly with the pallet sheets.

The machine incorporates a mechanism for transporting pallet sheets one at a time to a pallet assembly section defined by the framework. The pallet blocks, after being conveyed through the adhesive system for application of adhesive to the upper surface thereof, are positioned by a conveyor mechanism beneath and in sapced relation to the pallet sheet. A mechanism is then manipulated to move the pallet sheet downwardly into assembly with the pallet blocks and to apply sufficient mechanical pressure to the assembly for a predetermined period of time to allow curing of the adhesive material. The pallets manufactured by the machine may have a single pallet sheet or may have double pallet sheets sandwiched about the pallet blocks and may be adjustable to manufacture pallets of differing size.

19 Claims, 14 Drawing Figures

FIG. 2

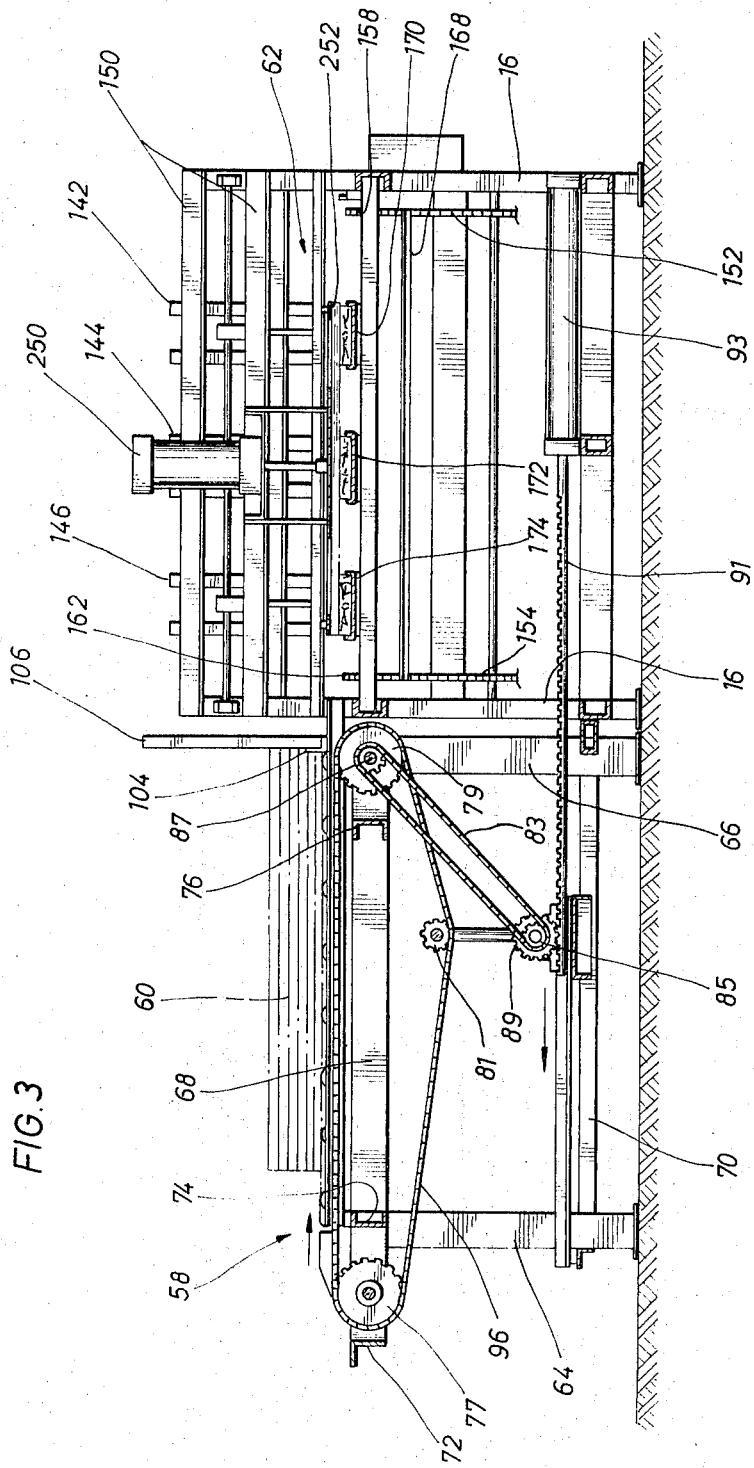

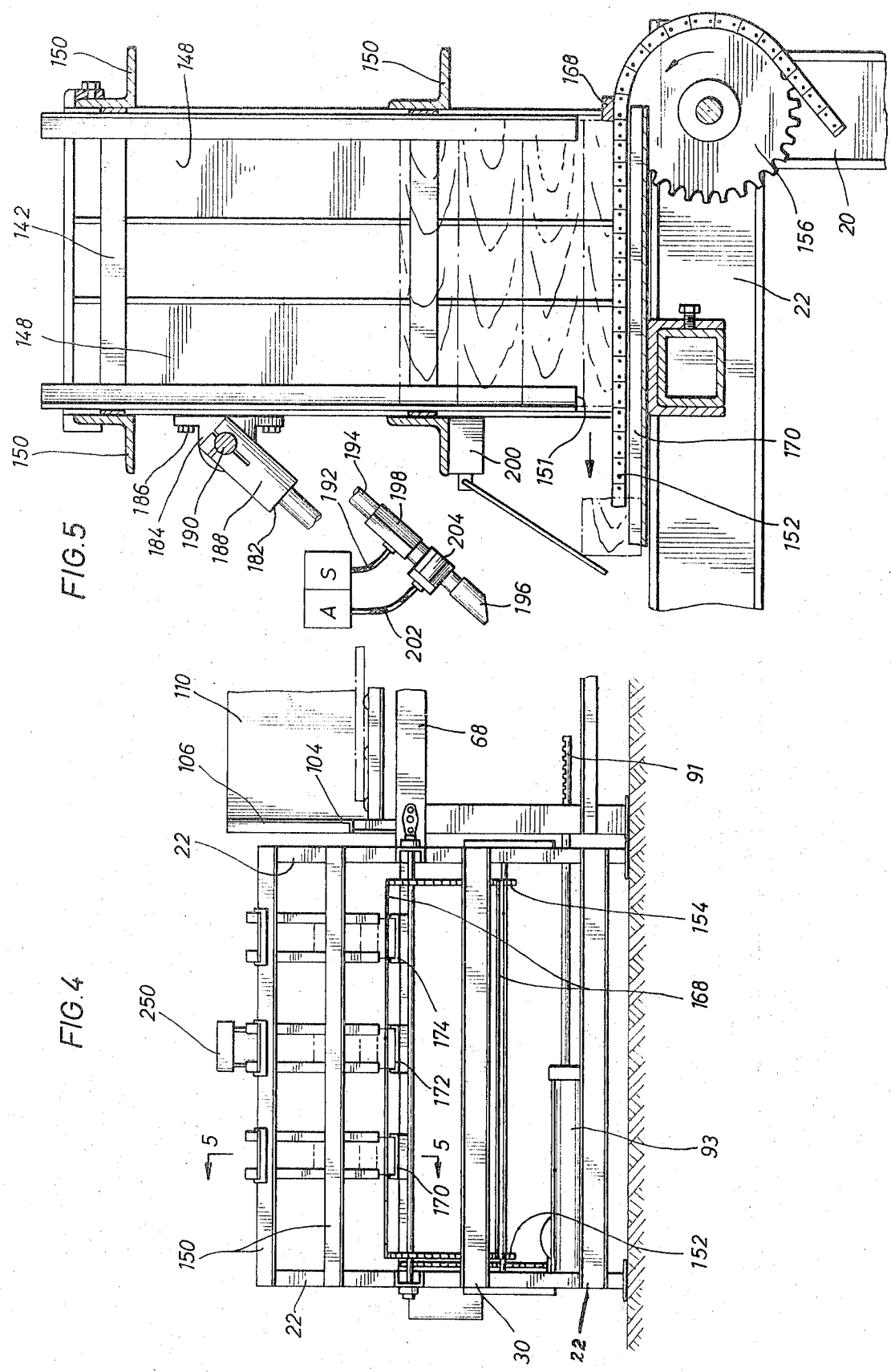

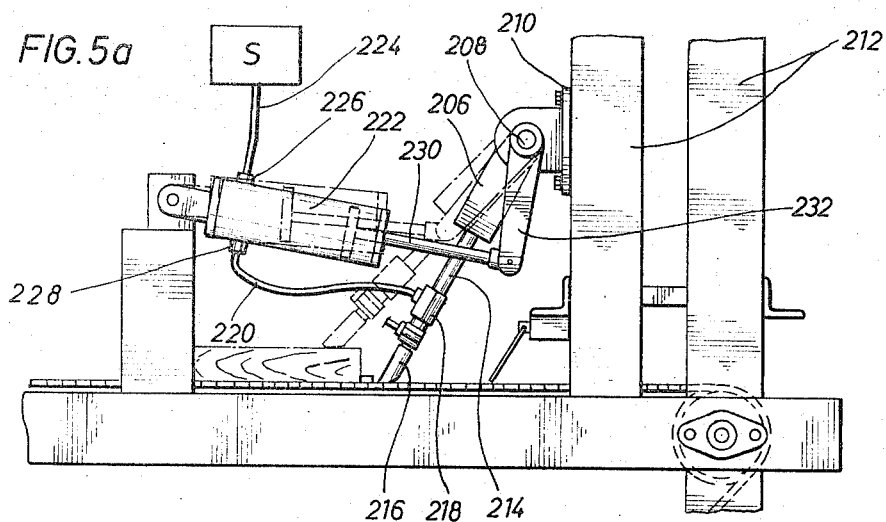
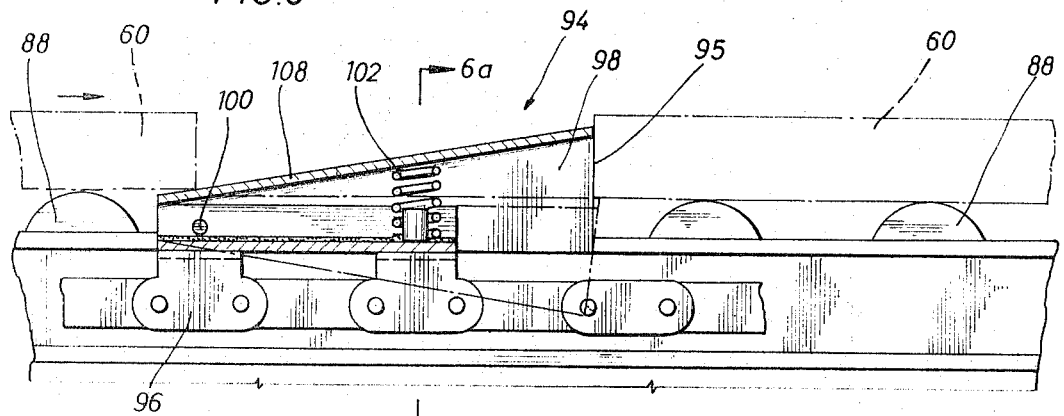
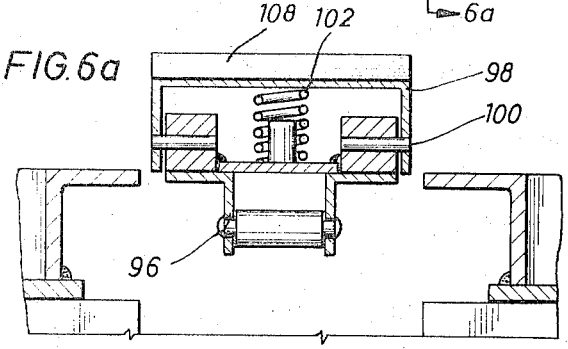
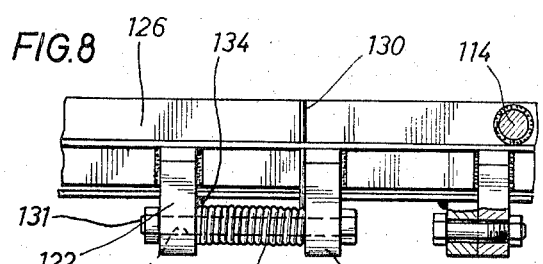
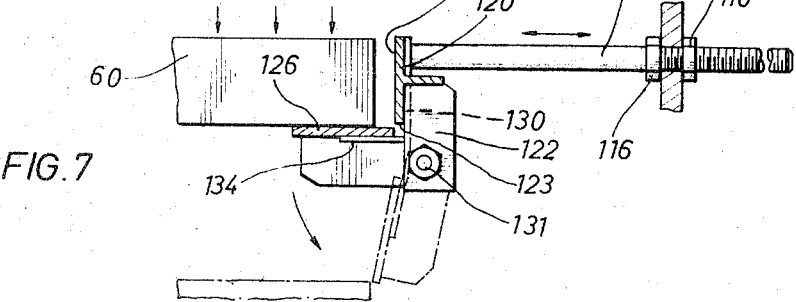

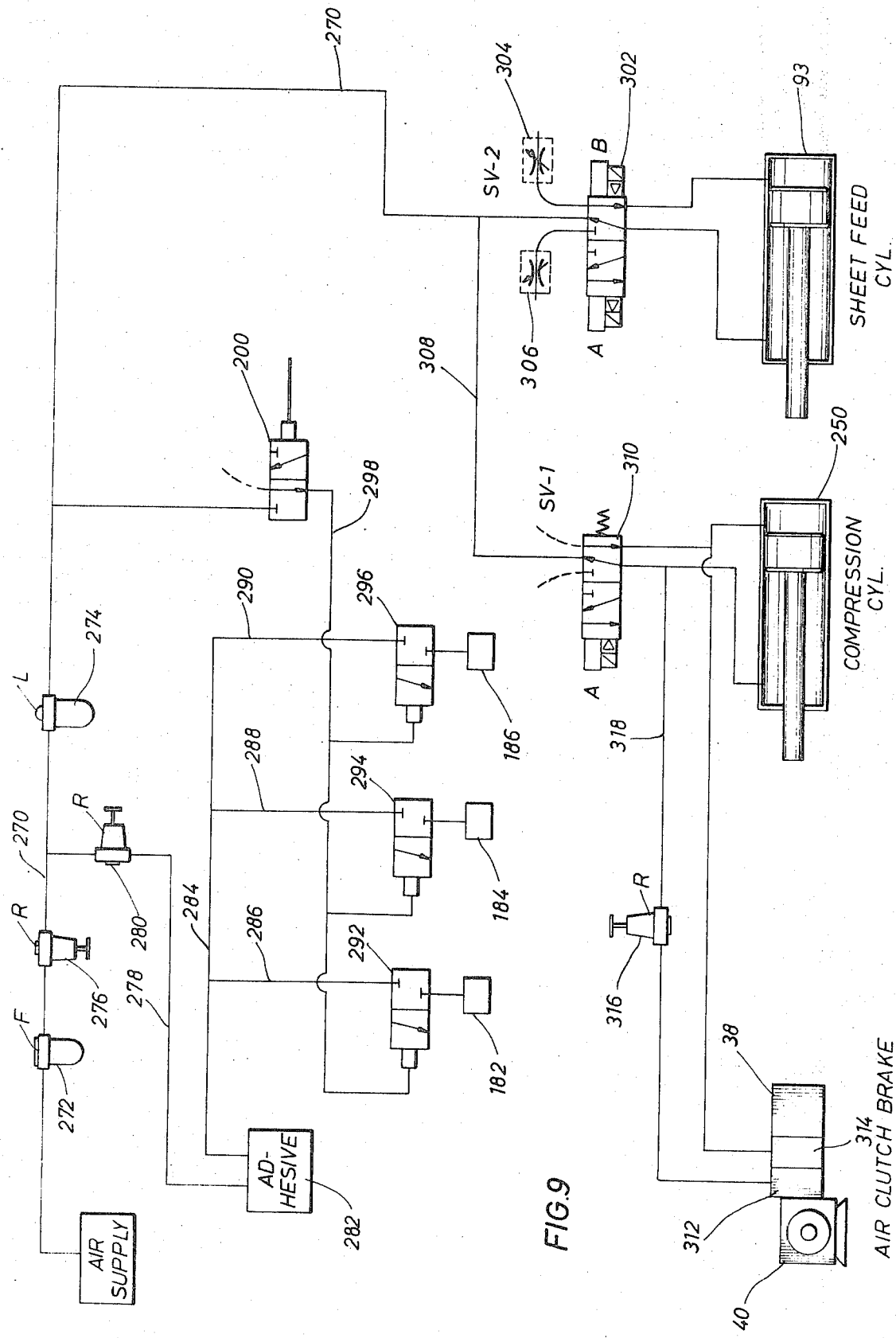

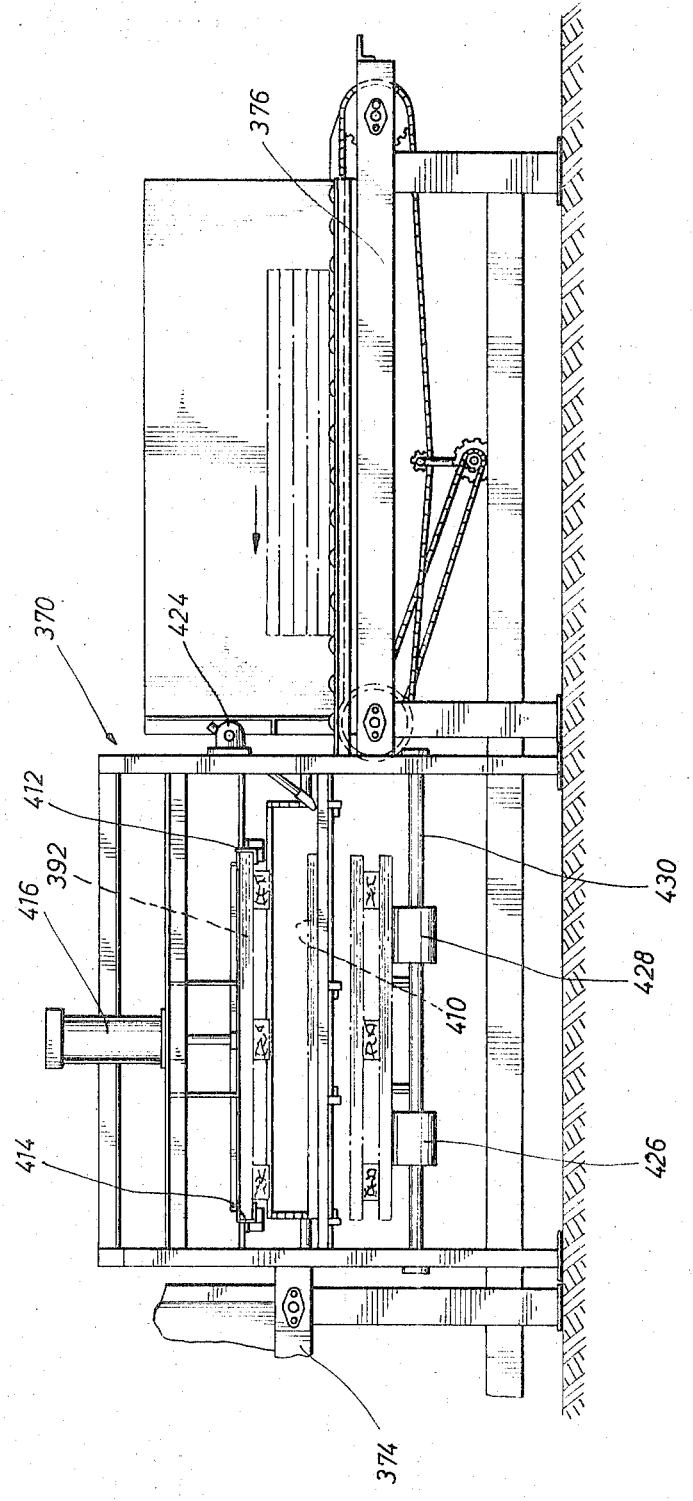

PALLET MANUFACTURING MACHINE

FIELD OF THE INVENTION

This invention is directed generally to pallets for supporting stacks of products or articles and more particularly is directed to the provision of a pallet manufacturing machine and method of manufacture for pallets that may be recycled if desired to prevent environmental pollution.

BACKGROUND OF THE INVENTION

It has long been the practice in the manufacturing and marketing industries to employ methods of palletizing, which involves stacking a large number of articles or products onto pallets in order that the products may be mass handled by machines, thereby limiting the cost of handling the articles or products as they are transported to the consumer after being manufactured.

The pallets, which are rigid platforms of sufficient structural integrity for supporting the articles or materials stacked thereon, historically have been manufactured of wood or combinations of wood and metal. Typically, the wooden or metal pallet parts are assembled with the use of nails and other non-recyclable binding or securing materials.

Pallets of light construction because of their wood and light metal composition are typically quite easily damaged during handling, for example, by forklift trucks or by other handling mechanisms. Damaged pallets are typically disposed by burning or by other typical means of refuse disposal. Since a large amount of non-recyclable material is typically utilized in the manufacture of pallets it is quite obvious that recycling of at least a major portion of the pallet materials cannot be accomplished unless the non-recyclable materials are separated therefrom. The expense of separating non-recyclable materials, as is typically the case when refuse is handled, is frequently sufficiently great as to render ineffective any process for recycling the materials from which the pallets are composed. Thus, the environment is typically adversely affected by disposal of damaged pallets.

Pallets manufactured from wood and secured in assembly by nails or other fastening devices typically are manufactured by manual labor, thereby adding substantial cost to the overall palletizing process. It is desirable therefore to provide pallet structures that are of low cost in order to promote the efficiency of the palletizing process.

It is also desirable in view of present activity to retard pollution of the environment to provide pallet structures composed of materials that may be entirely recyclable or may be disposed of without contaminating the environment.

It is therefore a primary object of the present invention to provide a novel pallet structure and method for manufacture thereof which is composed of materials that may be recycled.

It is another object of the present invention to provide a novel pallet manufacturing machine that will assemble disposable or recyclable pallets with little or no manual labor involved in the manufacturing process.

It is an even further object of the present invention to provide a novel pallet manufacturing machine that is capable of transporting various components of a disposable or recyclable pallet structure to an assembly point and assembling the same without the use of non-recyclable materials for the process of assembly.

It is also an object of the present invention to provide a novel pallet manufacturing machine having the capability of manufacturing pallets having only one pallet sheet or manufacturing pallets having plural pallet sheets maintained in spaced relation by a plurality of pallet blocks.

Among the several objects of the present invention is noted the contemplation of a novel machine for manufacturing disposable or recyclable pallets and which machine is of simple nature, is reliable in use and low in cost.

Other and further objects, advantages and features of the invention will become obvious to one skilled in the art upon an understanding of the illustrative embodiments about to be described and various advantages, not referred to herein, will occur to one skilled in the art, upon employment of the invention in practice.

SUMMARY OF THE INVENTION

The present invention is directed to a machine for manufacturing disposable or recyclable pallets on which material or articles may be stacked for purposes of handling and for assembling the materials to form the pallets without use of non-recyclable materials such as fastening devices, nails, metal parts or the like. The pallet manufacturing machine of the present invention may include a structural framework defining a pallet assembly section and having a pallet sheet feed section and a pallet block feed section for transporting pallet sheets and blocks to the assembly section. An adhesive system may also be provided for application of adhesive to the upper surface of the pallet blocks as the blocks are being conveyed into proper position at the pallet assembly section of the machine.

As the pallet sheets are conveyed to the pallet assembly section of the machine in serial manner from the stack of pallet sheets at the pallet sheet feed section, a pair of support rails may receive the single pallet sheets and maintain them in an elevated position above a plurality of block guide channels until a plurality of pallet blocks have been moved into proper position within the block guide channels beneath the pallet sheets. A compression mechanism, disposed at the pallet assembly section, may then be actuated to move the single pallet sheet downwardly into compressive engagement with the pallet blocks disposed therebeneath, such downward movement being accomplished by pivotal actuation of the support rails from a sheet supporting position where the pallet sheet is released. The compression mechanism will then apply mechanical pressure to the pallet block and pallet sheet assembly for a predetermined period of time that is appropriate to allow the adhesive to cure and retain the pallet blocks and pallet sheet in assembly. The compression mechanism will then retract, thereby releasing the completed pallet and a conveyor mechanism will be employed to eject the completed pallet from the machine, at which time the materials for a succeeding pallet may be brought into position at the assembly section of the machine.

If desired, the machine may have the capability of manufacturing pallets having a single pallet sheet or pallets having a plurality of pallet sheets maintained separated by a plurality of distributed pallet blocks.

The materials from which the pallets are formed are completely recyclable. The pallet sheets may be composed of a material such as paper board, while the pallet blocks may be composed of wood or any other recyclable product. The adhesive for securing the pallet sheet and pallet blocks into a finished assembly may be composed of any one of a number of biodegradable adhesive substances.

BRIEF DESCRIPTION OF THE DRAWINGS

In order that the manner in which the above recited advantages and objects of the invention are attained, as well as others, which will become apparent, can be understood in detail, more particular description of the invention, briefly summarized above, may be had by reference to the specific embodiments thereof, which are illustrated in the appended drawings, which drawings form a part of this specification. It is to be understood however, that the appended drawings illustrate only typical embodiments of thhe invention and therefore are not to be considered as limiting of its scope for the invention may admit to other equally effective embodiments.

In the Drawings

FIG. 2 is a plan view of the pallet manufacturing machine of FIG. 1.

FIG. 3 is a front elevational view of the pallet manufacturing machine of FIGS. 1 and 2 illustrating the pallet sheet feeding section and the conveyor mechanism therefor in detail and showing the relationship of the pallet block guide mechanism to the pallet assembly section.

FIG. 4 is a partial rear elevational view of the pallet manufacturing machine of FIG. 2 illustrating the block feed magazine of the machine and the relationship of the pallet block feed magazine to the block guide channels of the machine.

FIG. 5 is a sectional view taken along line 5—5 of FIG. 4, illustrating the pallet block feed magazine of the machine in detail and showing the adhesive application system that applies adhesive material to the upper surfaces of the pallet blocks as the same are extracted from the pallet block magazine and conveyed toward the pallet assembly section of the machine.

FIG. 5a is a fragmentary elevational view illustrating an adhesive application system for the machine of FIGS. 1 and 2 and representing a modified embodiment of the present invention.

FIG. 6 is a fragmentary sectional view of the sheet pusher assembly of the sheet feed mechanism illustrating pushing movement of the pusher mechanism in full line and illustrating the retracted position of the pusher mechanism in broken line.

FIG. 6a is a sectional view taken through the pusher dog assembly of FIG. 6, illustrating the compression spring energizing mechanism and the pivot assembly thereof in detail.

FIG. 7 is a fragmentary sectional view of one of the support rail assemblies illustrating the supporting position thereof in full line and showing the sheet release position thereof in broken line.

FIG. 7a is a fragmentary side elevational view of the support rail assembly of FIG. 7, illustrating the spring energized pivot assembly thereof in detail.

FIG. 8 is a fragmentary elevational view of the sheet support rail assembly of FIG. 7 illustrating the pivotal assembly of the sheet support rail mechanism.

FIG. 9 is a schematic diagram illustrating the air supply system of the present invention.

FIG. 12 is an elevational view showing the structure of the pallet manufacturing machine of FIG. 11.

DESCRIPTION OF PREFERRED EMBODIMENTS

Figure 1:
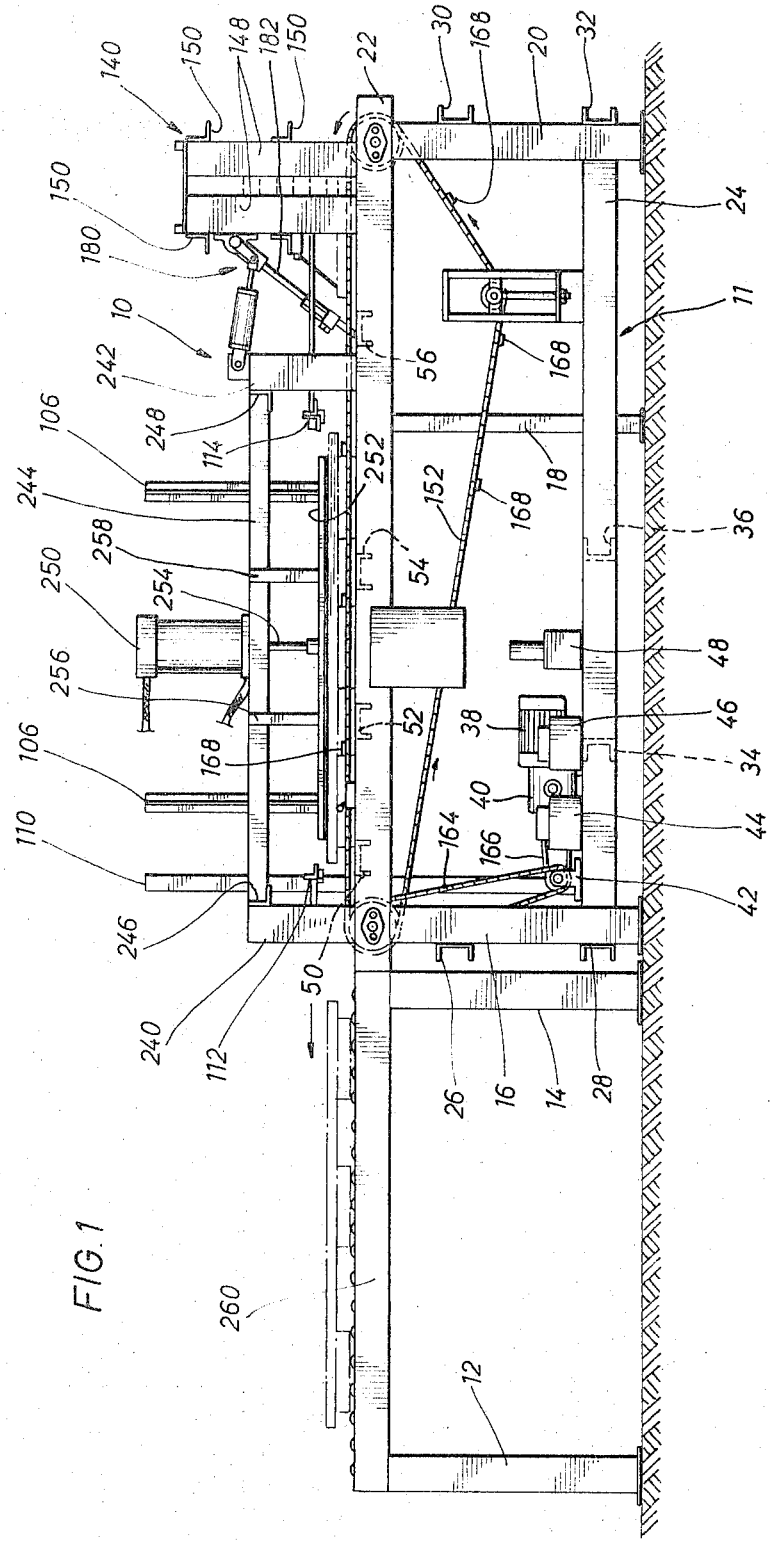
FIG. 1 is an elevational view of a pallet manufacturing machine constructed in accordance with the present invention and illustrating the pallet assembly section, the pallet block magazine section, the adhesive system, and the pallet block conveyor mechanism of the machine in detail.

Referring now to the drawings, and first to FIG. 1, there is shown a pallet manufacturing machine generally at 10 which includes a framework 11 defined in part by a plurality of vertical posts 12, 14, 16, 18 and 20. Upper and lower pairs of generally horizontal structural elements 22 and 24 may be secured to the vertical posts 16, 18 and 20 by welding, by bolting or by any other suitable means of connection. Transverse structural elements 26, 28, 30 and 32 may be secured in like manner to the vertical posts to provide transverse structural support for the framework. The structural elements 26 through 30 may be composed of structural channel or, if desired, may take the form of any other suitable structural elements capable of providing sufficient transverse structural support for the framework. To the lower pairs of horizontal supports 24 may be connected intermediate transverse support elements, such as shown in broken line at 34 and 36, that cooperate with the horizontal support members to support a power and control assembly which may include an electric motor 38, a gear reduction mechanism 40, a power transfer sprocket 42 and various solenoid energized air valves and air operated devices 44, 46, and 48 for control of the pallet manufacturing machine. The electrically energized air control devices 44, 46 and 48 are merely representative of one suitable means for controlling operation of the pallet manufacturing machine of this invention, it being obvious that other control devices of different nature may be employed with equal success within the spirit and scope of the present invention.

To the upper pair of horizontal supports 22 may be affixed a plurality intermediate transverse support elements, such as shown in broken line 50, 52, 54 and 56 which provide transverse structural support for a conveyor mechanism, to be described hereinbelow and for an assembly section 62 of the pallet manufacturing machine.

A machine for manufacturing disposable or recyclable pallets, in accordance with the present invention, may be provided with means for supplying stacks of the various parts from which the pallets are composed and for transporting the parts to an assembly point where they may be assembled to form the pallet structures. According to the present invention, a mechanism for retaining a plurality of stacked pallet sheets may conveniently take the form illustrated particularly in FIGS. 2 and 3, where a pallet sheet feed mechanism, illustrated generally at 58, is provided for supporting a stack of pallet sheets, illustrated in broken line at 60 in FIG. 3 and for transporting the sheets one at a time to a pallet assembly section of the machine illustrated generally at 62. The sheet feed section 58 may comprise upright posts 64 and 66 to which may be connected, by welding, bolting or the like, upper and lower pairs of structural supports 68 and 70, respectively. An upper transverse structural support element 72 may be connected to one of the extremities of the upper horizontal structural supports 68 while the opposite extremities thereof may be secured to one of the horizontal structural supports 22, illustrted in FIG. 1. A pair of intermediate transverse supports 74 and 76 may be disposed in generally parallel relation and connected at each extremity thereof to the horizontal structural supports 68 and may provide support for parallel roll conveyors 78, 80 and 82. Each of the parallel roll conveyors may include a plurality of parallel rollers supported between generally parallel structural elements, which rollers allow articles positioned thereon to be quite easily moved into position for assembly of a pallet. Each of the roller conveyors may comprise a pair of generally parallel structural elements, such as shown at 84 and 86 in FIG. 2, having a plurality of apertures formed therein and providing journals for opposing axle pins of a plurality of freely rotatable rolls 88.

Figure 2:
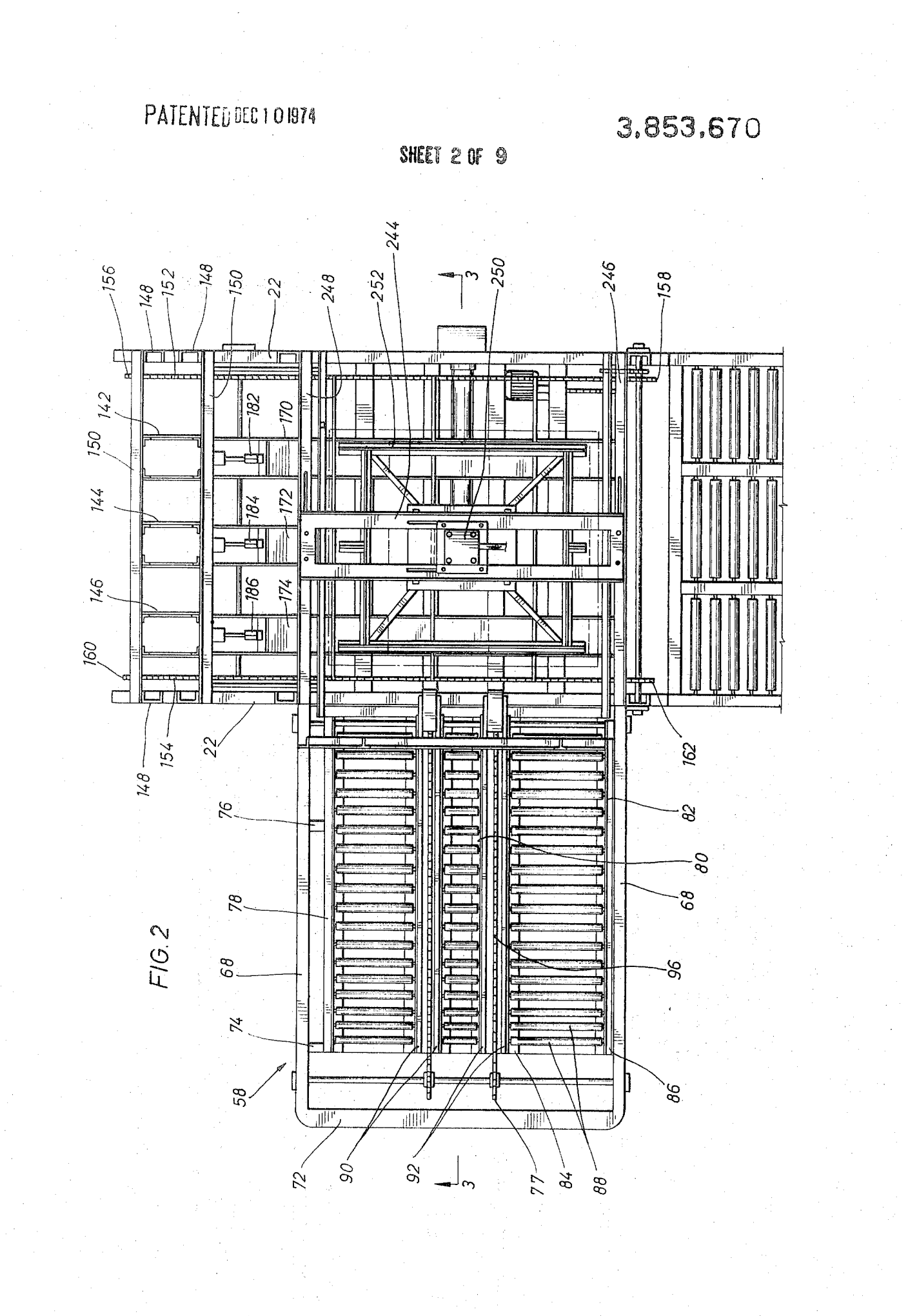

The conveyor mechanisms 78 and 82, as shown in FIG. 2, are spaced from the centrally located conveyor 80 in such manner as to provide for movement of a chain drive sheet pusher mechanism therebetween. Pairs of spaced and parallel related pusher guide elements 90 and 92 may be interposed between the conveyor mechanisms and may be spaced to provide a pusher guide slot between the conveyor mechanisms for guiding reciprocal movement of one or more pusher dogs described in detail hereinbelow. The conveyor 80 may be defined by freely rotatable rolls journaled for rotation in the pusher guide elements 90 and 92.

With reference now to FIG. 3, a mechanism is shown to be provided for achieving reciprocation of the pusher dogs for transporting single pallet sheets to the assembly section of the machine. Although other pusher operating mechanisms may be employed within the spirit and scope of the present invention, one suitable embodiment thereof is shown in FIG. 3 and incorporates one or more endless chain conveyors 96 disposed about a pair of driven sprockets 77 and 79. The pusher dog mechanism may be connected to the conveyor chain 96 in the manner described below in connection with FIG. 6. An idler sprocket 81 may be employed to adjust the tension of the conveyor chain 96. A drive chain 83 may be connected to a pair of drive sprockets 85 and 87 for establishing driving relation between a pinion gear 89 and the driven sprocket 79. A rack element 91 may be driven linearly by a fluid motor 93 to achieve rotation of the pinion gear and, through the drive chain 83, impart driving movement to the sprockets 85 and 87 to cause reciprocation of the sheet pusher dogs.

In order to manufacture pallets having a plurality of pallet blocks evenly distributed on the under surface thereof, it will be desirable to provide a mechanism for supplying the pallet blocks and to provide a conveyor mechanism for properly positioning the blocks relative to the assembly section of the pallet manufacturing machine. In accordance with present invention, a pallet block supply mechanism and a pallet block conveyor may conveniently take the forms illustrated in FIGS. 1 and 2 where a pallet block supply magazine illustrated generally at 140 may comprise a plurality of block supply hoppers 142, 144 and 146 that are secured into assembly with the framework of the machine by upright structural elements 148 to which may be connected horizontal structural elements 150. The pallet blocks, as indicated above, may be composed of wood or any other suitable material that may be recycled upon disposal of the pallets after use without contamination of the environment. It has been determined that short pieces of ordinary 2 × 4 wood material make excellent pads for assembly with paper board pallet sheets.

The individual hoppers may be provided with openings 151 at the lower extremity thereof that allow only a single pallet block to be extracted from each hopper at any one time. As shown in FIGS. 1 and 2, the pallet block magazine 140 is provided with three hoppers 142, 144 and 146. It is desirable to extract a plurality of pallet blocks from each of the three hoppers and to place the pallet blocks in proper position beneath a pallet sheet for evenly distributed assembly to the pallet sheet. A suitable mechanism for accomplishing extraction of pallet blocks from the hoppers and distribution of the pallet blocks, may conveniently take the form of a pair of spaced conveyor chains 152 and 154 disposed in endless manner about sprocket elements 156, 158, 160 and 162 and adapted to be driven simultaneously by a drive chain 164 that is connected through the sprocket mechanism 42 and a drive chain 166 to the reduction gear mechanism 40 of the motor 38. To achieve movement of a plurality of pallet blocks from the hoppers and to position the same at the pallet assembly section of the machine a plurality of flight bars 168 may be connected to each of the conveyor chains 152 and 154 and may be maintained in properly spaced and generally parallel relation. The spacing between the flight bars 168 may be varied in order to vary the position of the pallet blocks at the pallet assembly section of the machine. It is therefore desirable to connect the flight bars 168 to the conveyor chains 152 and 154 in such manner that they may be removed and repositioned for spacing adjustment.

As the flight bars 168 are conveyed past the magazine 140 each of the flight bars extracts one pallet block from each of the three hoppers 142, 144 and 146 and conveys the pallet blocks along three parallel related block guide channels 170, 172 and 174. The block guide channels 170 extend from the hoppers to the pallet assembly section of the machine below a pallet sheet being supported by the sheet holding rails 112 and 114. As the first of the flight bars 168 moves into proper position at the pallet assembly section to cause proper positioning of the pallet blocks carried thereby the drive motor 38 will be de-energized thereby causing the conveyor mechanism to stop and positioning a selected number of the flight bars 168, and the pallets blocks carried thereby, beneath the pallet sheet for assembly with the pallet blocks. Any suitable mechanism may be employed for achieving controlled de-energization of the motor. For example, a limit switch may be contacted either by the first of the group of flight bars or by the pallet block carried thereby in order to achieve de-energization of the motor 38 when the first of the group of blocks is properly positioned relative to the pallet sheet to which the same are to be adhered. When this occurs, the remaining blocks to be attached to the pallet plate will be properly positioned in evenly distributed manner beneath the pallet sheet.

It will be desirable to remove one sheet at a time from the stack of pallet sheets and to convey that sheet to the pallet assembly section of the machine for assembly with other parts of the pallet structure. It is also desirable that the pusher dog elements, for moving the single pallet sheet, be capable of retracting upon movement of the conveyor mechanism back to a startng position thereof to prevent the stack of pallet sheets from being disturbed during retraction of the conveyor mechanism. One suitable means for extracting pallet sheets from the stack during movement of the conveyor mechanism in one direction and for retracting without disturbing the stack of pallet sheets may conveniently take the form illustrated in FIG. 6, where at least one and preferably a pair of pusher dogs, one of which is shown at 94, may be suitably connected to one of the conveyor chains 96 of the sheet feed conveyor mechanism. The pusher dog 94 may include a moveable pusher element 98 that may be pivoted at one extremity thereof by a pivot pin 100 while the opposite extremity thereof may be urged upwardly by any suitable urging means, such as a compression spring 102. The compression spring 102 which is a rather weak spring, may be capable of imparting sufficient force to the pusher element 98 to move it to the uppermost or pushing position thereof, but will not be of sufficient strength to raise the pusher element and a single pallet sheet.

The freely rotating rolls 88 position the lowermost pallet sheet in the stack of pallet sheets at a position where only the lowermost sheet is contacted by a pushing face 95 of the pusher element 98, when the pusher element is disposed in the uppermost of pushing position thereof. As the pusher dog 94 is moved in the sheet feeding direction thereof the pusher element 98, being disposed in the uppermost position thereof by the spring 102, will contact the lowermost sheet and slide the lowermost sheet from the bottom of the stack 60 toward the pallet assembly section of the machine. A barrier, including a horizontal barrier element 104 and a plurality of upright stack supports 106 may be supported by the framework of the sheet feeding section of the machine and may prevent all but the lowermost pallet sheet from being moved as the lowermost sheet is moved toward the pallet assembly section of the machine. As the lowermost pallet sheet is pushed by the pusher dog elements toward the assembly section of the machine, the transverse barrier element 104, being disposed above the level of the upper surface of the lowermost pallet sheet, allows the lowermost pallet sheet to be moved into the assembly section of the machine while restraining movement of the other sheets in the stack of pallet sheets.

After the pusher element has moved a pallet sheet into the pallet assembly section of the machine it will be desirable to retract the pusher elements to an initial starting position where the next sheet in a stack of pallet sheets may be contacted and moved into the assembly section. As the direction of the drive chains 96 is reversed and the pusher dog 94 is retracted, a cam surface 108 defined on the pusher element 98 will contact the lower pallet sheet of the stack of pallet sheets and, because the compression spring 102 is unable to support the weight of a single pallet sheet, the force induced to the pusher element 98 through the cam surface 108 by the lowermost pallet sheet, will cause the spring 102 to be compressed, thereby pivoting the pusher element 98 to the broken line position thereof and allowing it to pass beneath the lowermost pallet sheet. Upon clearing the lowermost pallet sheet, after full retraction, the compression spring will again pivot the pusher element 98 to the full line position thereof, thereby disposing the pushing face of the pusher element for contact with the next sheet to be moved to the assembly section of the machine.

To facilitate the positioning of the stack of pallet sheets on the freely rotatable rolls of the sheet feeding mechanism an alignment plate 110 may be connected to the framework of the sheet feeding section of the machine and pallet sheets, when placed into stacked relation in the machine, may be abutted with the alignment plate 110 and with the vertical barrier posts 106, thereby positively orienting the stack of pallet sheets for feeding the pallet sheets into proper position at the assembly section of the machine simply by linear movement of the sheet feeding mechanism.

It will be desirable to move pallet sheets from the sheet feeding mechanism to a predetermined position at the assembly station and to convey pallet blocks to particular positions at the pallet assembly section and then to move the pallet sheet and pallet blocks into intimate assembly in the presence of an adhesive capable of securing the pallet sheet and pallet blocks in assembly to form a finished pallet article. Although it may be desirable to position the pallet sheet and then raise or lower the pallet blocks into assembly therewith, in accordance with the preferred embodiment of the present invention, it is considered desirable to position the pallet sheet at the pallet assembly section and, after properly positioning the pallet blocks, to lower the pallet sheet into assembly with the pallet blocks and secure the same in assembly by means of an adhesive.

It is desirable therefore to provide support devices that will support the pallet sheet above the assembly level thereof and to allow the pallet sheet to be released and moved downwardly for assembly. One suitable means for accomplishing such releasable support of a single pallet sheet, may conveniently take the form of a pair of spaced pallet sheet support rails such as shown at 112 and 114 in FIG. 1, which rails are shown in detail in FIGS. 7 and 8. As shown in FIG. 7, which is a sectional view of the support rail assembly, the supporting position of the pallet support rails where a sheet of pallet material is supported in elevated position at the assembly section of the machine is shown in full line. In broken line FIG. 7 the rail assembly is illustrated in the released position thereof as a pallet sheet is forced downwardly by a compression mechanism, to be described below, for assembly of the pallet sheet and the pallet blocks.

As shown in FIG. 7, a holding rail adjustment bar 114 may extend through an appropriate aperture defined in a structural element of the framework of the machine and may be secured by lock nuts 116 and 118 to position the holding rail mechanism for support of pallet sheets of a particular size. The adjustment bar may be adjusted for the manufacture of pallets of different size. An elongated support bar 120 may be fixed by welding or the like to the adjustment bar 114 and may be provided with a plurality of depending hanger elements 122 having pivot apertures 124 defined therein. A support rail, which may simply be a simple elongated plate element 126 may be provided with a plurality of pivot lugs 128 each receiving pivot pins 131, which may conveniently take the form of bolts or any other acceptable pivot pin device which also extends through the pivot apertures 124 of the hanger elements 122 thereby establishing pivotal connection of the rail element 126 with the depending hanger elements 122 and allowing the rail element to be pivoted from the full line position thereof to the broken line position, as illustrated in FIG. 7. The support bar 120, in addition to providing a guide surface 121 for the pallet sheets, also provides a lower stop surface 123 to position the support rail 126 in generally horizontal manner in the supporting position thereof. A torsion spring 132 or any other suitable urging means may be disposed about the pivot 131 and may include urging portions 130 and 134 engaging the support bar 120 and support rail, respectively, and may serve to urge the pivotal rail 126 to the full line or holding position thereof. The spring 132 may be of sufficient stiffness to maintain the rail in the full line position thereof even when a sheet of pallet material is being supported by the rail structure but will yield under application of force urging the sheet downwardly.

Before the pallet blocks are positioned at the assembly section of the machine, it will be desirable to coat one surface of the blocks, one surface of the pallet sheet, or both with an adhesive material which, when maintained under mechanical pressure for a predetermined period of time will cause the blocks to adhere to the pallet sheet. One suitable means for providing the pallet blocks with a coating of adhesive material may conveniently take the form illustrated in FIGS. 1 and 5 where an adhesive application system, illustrated generally at 180, is employed which system may incorporate a plurality of adhesive distributing heads 182, 184 and 186, one being associated with each of the hoppers and block guide channels in order to apply an adhesive material to the upper surface of the pallet blocks as the blocks are conveyed from the hoppers to the assembly section of the machine.

As shown in detail in FIG. 5, each of the adhesive distributing heads may be supported by a bracket 184 secured to structural elements of the hopper framework by a plurality of bolts 186 an actuator portion 188 may be connected by a pivot 190 to the bracket 184, thereby allowing the adhesive head 182 to pivot relative to the bracket. Adhesive material may be communicated to the actuator portion 188 of the adhesive 182 from any convenient source, shown schematically at S through a supply conduit 192. A connection arm 194 may connect the actuator portion 188 of the adhesive head to an adhesive supply connector 198 which may support an adhesive distributor positioned for contact with a pallet block being transported from the hopper along the pallet block guide channel toward the assembly section of the machine. As the pallet block leaves the respective hopper it is conveyed into contact with the distributor portion 196 of the adhesive head 182, thereby causing the adhesive to be pivoted about the pivot 190 and causing the lower extremity of the distributor portion to travel along the upper surface of the pallet block as the pallet block is conveyed relative thereto. As this pivotal action takes place an electrical control circuit may be energized through a pneumatic limit valve 200 actuated by the flight bars 168 or through any other suitable control mechanism that is responsive to pivotal movement of the adhesive head and may allow a measured quantity of adhesive material to be deposited in distributed manner on the upper surface of the pallet block being engaged by the distributor portion 196. A source of compressed air, illustrated schematically at A in FIG. 5, may be communicated through a conduit 202 to a control valve mechanism 204 thereby allowing air assisted flow of adhesive material from the adhesive supply source S under control of the adhesive supply mechanism. The pneumatic valve 204 may be responsive to the pneumatic valve 200 or to any other suitable means of control for achieving distribution of the adhesive material.

With reference now to FIG. 5a an alternative embodiment of the adhesive system is disclosed which may include a plurality of adhesive heads 206 being connected by a pivot 208 to a bracket 210 that may be bolted or otherwise fixed to an upright member 212 or to any other suitable structural element of the pallet block hoppers. The adhesive head may be provided with an extension arm 214 having a distributor portion 216 disposed at the lower extremity thereof. An adhesive supply connector element 218 may be provided on the arm 214 and may be in communication both with an adhesive distributor 216 and with a supply conduit 220 that is connected to an adhesive cylinder 222. A supply source S of adhesive material may be communicated by conduit 224 to the cylinder 222 and flow of adhesive material into and out of the cylinder may be controlled by check valve elements 226 and 228 connecting the conduits 224 and 220, respectively, to the cylinder 222. The cylinder 222 may include an actuator stem 230 that may be pivotally connected to a bell crank 232 that is maintained in immovable relation to the adhesive head 206 by the pivot pin 208.

As a pallet block is conveyed from the hopper toward the assembly section of the pallet making machine, the block will contact the distributor portion 216 of the adhesive head 206 and will move the entire adhesive head to the position illustrated in broken line in FIG. 5. The bell crank 232 will be caused to be pivoted, along with the adhesive head, to the broken line position thereof, thereby causing the actuator stem 230 to impart controlling movement to the piston disposed within the cylinder 222, thereby causing adhesive material, disposed within the cylinder, to be ejected through the supply conduit 220 and through the supply connection element 218 to the distributor head 216. Adhesive material will flow from the distributor portion 216 onto the upper surface of the pallet block being conveyed toward the assembly section of the machine.

After the pallet block has passed beneath the distributor portion 216 of the adhesive head, the adhesive head will be moved back to the full line position thereof either by the inherent weight of the adhesive distributing apparatus or by any suitable urging means. During the retraction movement of the adhesive head mechanism, the actuating stem 230 of the cylinder 222 will be moved to a position causing more adhesive material to be drawn from the supply source S into the cylinder, thereby conditioning the cylinder for application of adhesive to the next pallet block being conveyed.

After a pallet sheet has been positioned on the pallet rails by the pallet feed mechanism and a plurality of pallet blocks have been beneath the pallet sheet with uncured adhesive material applied to the upper surface of the pallet blocks, it will be desirable to move the pallet blocks and pallet sheet into intimate assembly and to maintain predetermined mechanical pressure therebetween until such time as the adhesive material has become sufficiently cured to firmly adhere the pallet blocks and pallet sheets in assembly. Although the pallet blocks and pallet sheet may be moved into assembly in a number of different ways, one suitable means for achieving such movement may conveniently take the form illustrated in FIGS. 1 and 2 where the framework of the machine may be provided with vertical upright pairs of structural elements 240 and 242 to which may be connected intermediate transverse structural elements, such as shown at 244, 246 and 248. As shown in FIG. 2 the structural element 244 comprises a generally rectangular frame member providing a transverse support for a linear fluid motor 250 adapted for raising and lowering a compression frame 252 that may be connected to an actuating stem 254 of the fluid motor. A plurality of guide elements 256 and 258 may be secured to the compression frame 252 and may serve to guide the compression frame to prevent rotation thereof as the fluid motor 250 is actuated.

After a pallet sheet has been conveyed to the sheet holding rails 112 and 114 by the sheet feed mechanism, as described above, and after a plurality of adhesive coated blocks have been properly positioned at the assembly section of the machine, the fluid motor 250 may be energized in such manner as to move the compression frame 252 downwardly into engagement with the pallet sheet being supported by the rails. Continued downward movement of the compression frame will cause the sheet supporting rails to pivot to the released position thereof as shown in FIG. 7, thereby allowing the sheet to descend into engaging relation with the pallet blocks. The compression frame 252 will then continue to move downwardly until the pallet sheet is again contacted and predetermined mechanical pressure is applied to the pallet sheet and pallet block assembly. The mechanical pressure will be maintained for a predetermined period of time to allow the adhesive material to cure and form a firm bond between the pallet sheet and the pallet blocks, thereby completing the pallet assembly. A timing mechanism, illustrated in FIG. 10, may be employed to control the period of time that the mechanical pressure must be maintained to allow the adhesivve to form a desired bond.

After the bond has been formed and the pallet is then complete, the conveyor motor 38 will again be energized, thereby causing the conveyor chain mechanism 152 to again be moved in the direction shown by arrows. The flight bars 168 will serve as pushers to convey the finished pallet from the assembly section of the machine to an exit conveyor section 260 supported by the posts 12 and 14. The exit conveyor section may be mechanically ennergized, if desired, to convey the finished pallets to a suitable pallet handling facility, not shown, where the pallets may be stacked for storage or may be further utilized. For example, the exit conveyor may conduct the finished pallets to an article stacking machine where articles may be stacked onto the pallets for shipping and further handling.

The pallet manufacturing machine of the present invention may incorporate an air supply system essentially as schematically depicted in FIG. 9, where air or any other suitable gasiform fluid may be maintained under pressure in an air reservoir A and may be communicated by a supply conduit 270 to energize various components of the machine. The conduit 270 may be provided with a filter 272 to prevent air from reaching the control system of the machine in contaminated condition and may be provided with an air lubricator 274. A primary regulator 276 may be provided to maintain the air supply at a predetermined operating pressure level.

The adhesive supply system of the machine may, if desired, be energized by air pressure form the air supply as shown in FIG. 9. A conduit 278 may extend from the air supply conduit 270 and may be provided with a regulator 280 to maintain the adhesive system at a predetermined pressure level. An adhesive reservoir 282 may contain a supply of adhesive material which adhesive material may be forced by air pressure in the reservoir 282 into an adhesive supply conduit 284 for distribution to each of the adhesive heads through conduits 286, 288 and 290 and may allow the flow adhesive material to each of the three adhesive heads 182, 184 and 186, respectively. The valves 292, 294, and 296 may be pneumatic valves, energized by a pneumatic circuit illustrated in FIG. 9 and discussed hereinbelow. An exhaust conduit 298 may extend from the valve 292 to an exhaust valve 200 which exhaust valve may be actuated by the flight bars 168 to cause the adhesive valves to actuate and allow flow of adhesive material to the adhesive distributors of the various adhesive heads.

The pallet manufacturing machine of the present invention may incorporate a compressed air system for energizing the pallet compression mechanism at the pallet assembly section of the machine and for controlling operation of an air clutch brake assembly for the motor drive mechanism of the machine. As shown in FIG. 9, the air supply conduit 270 may conduct compressed air to the linear motor 93 under control of a solenoid energized valve mechanism 302 having speed control devices 304 and 306 associated therewith for controlling the operating speed of the fluid motor 93. Cooperation between the solenoid valve 302 and the speed control devices 304 and 306 will allow the fluid motor to be energized in either direction at controlled speed. A branch supply conduit 308 may be utilized to communicate compressed air from the air supply source A through a solenoid valve 310 to the fluid motor 250 at the assembly section of the machine and to communicate compressed air to an air clutch 312 and air brake mechanism 314 for the conveyor drive motor 38. A regulator 316 may be connected to a conduit 318 extending from the solenoid energized control valve 310 to the air clutch mmechanism 312 in order to provide the air clutch with compressed air at controlled operating pressure.

Figure 10:
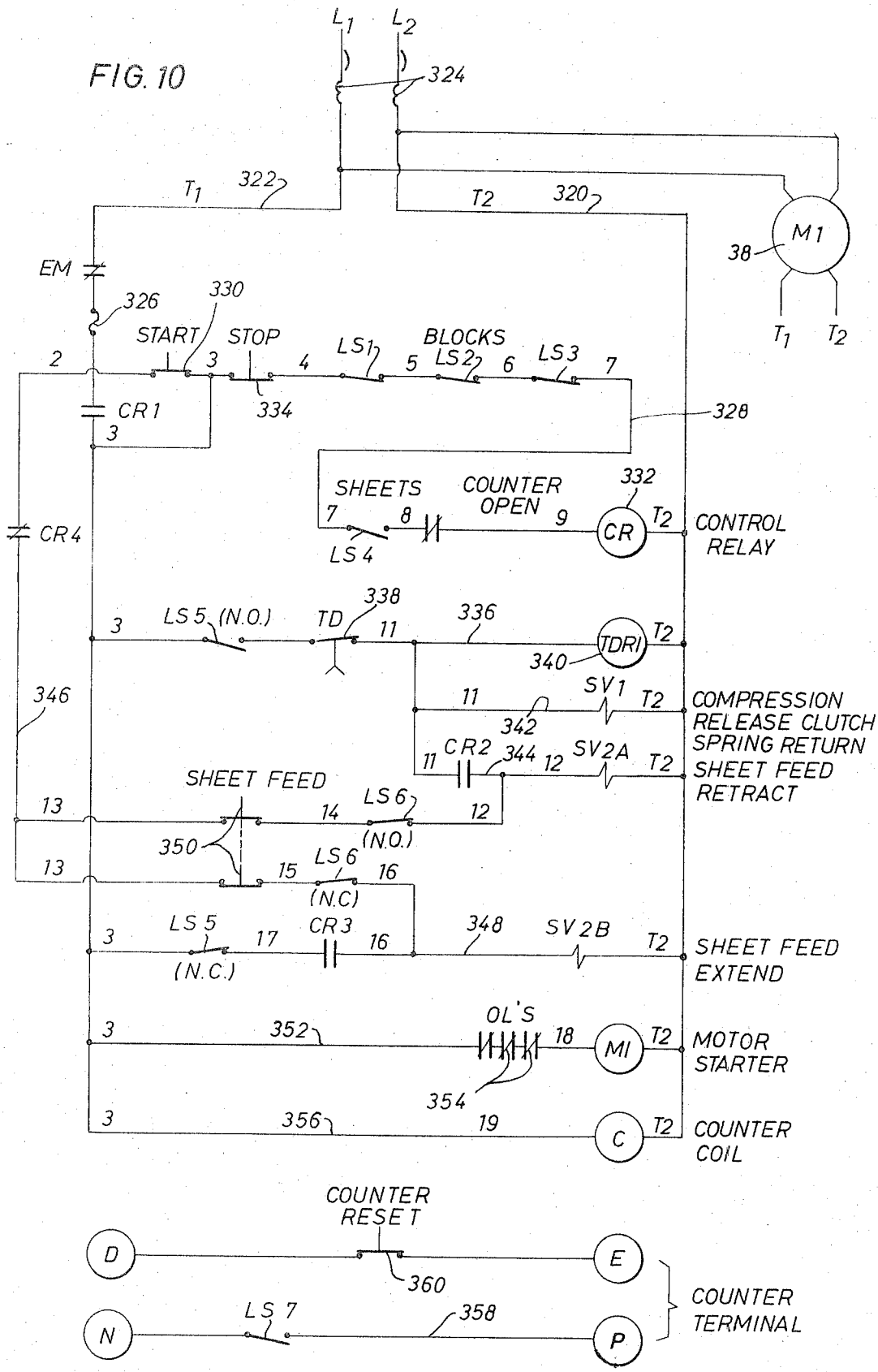
FIG. 10 is a schematic diagram illustrating the electrical system of the machine of FIGS. 1 and 2.

For the purpose of controlling the flow of compressed air to various components of the machine for operation thereof and for controlling the electrically energized functions of the machine, it will be appropriate to provide an electrical system which, if desired, may take the form illustrated schematically in FIG. 10, where a pair of main power conductors 320 and 322 are illustrated which supply electrical power to the machine from any suitable source of electrical potential. Breakers 324 are employed in the power conductors to completely de-energize the electrical circuitry of the machine in the event an excessive amount of current should be drawn by the circuitry due to a malfunction of any electrical component. A fuse 326 may be provided in the power conductor 322 for controlling the maximum amount of current that may be drawn by the control portion of the circuitry. A block conveyor circuit 328 may be connected across the conductors 320 and 322 and may be energized through a conventional holding circuit including a starting contact 330 for energization of a control relay 332. A normally closed stop contact 334 may be actuated manually for de-energization of the control circuitry and a plurality of limit switches LS1, LS2, LS3 and LS4 may be utilized for control of the circuitry responsive to the condition of the block conveyor mechanism or the position of the pallet blocks within the machine.

For control of the period of time under which the pallet and pallet block assembly is maintained under compression for curing of the adhesive, a time delay circuit 336 may be connected across the conductors 320 and 322 and may include a time delay switch 338 that may be closed by a time delay relay 340 and may open, responsive to passage of the predetermined period of time, for de-energizing the time delay circuit. The time delay circuit will remain de-energized until such time as normally open limit switch LS5 is closed by the pallet sheet and/or pallet block positioned at the assembly section of the machine. A compression release circuit 342 and a sheet feed retract circuit 344 may be energized through the time delay circuit for maintaining the compression cylinder under energized condition during the period established by the time delay and for retracting the sheet feed mechanism to its starting position during the compression cycle established by the time delay. A normally closed limit switch LS6 may be operative to de-energize the sheet feed retract circuit after the sheet conveyor mechanism has fully retracted to its starting position. A control delay contact CR4 may be connected to a conductor 346, thereby allowing the sheet feed retract circuit to be energized only when the control relay 332 is enerized.

A circuit 348 may be connected across conductors 320 and 322 and may be operative, responsive to energization of the circuit 346, for controlling feeding of pallet sheets from the pallet feed mechanism to the assembly section of the machine. The circuit 348 may be energized only when the circuit 344 is de-energized because a switch mechanism 350 is connected to both the sheet feed retract and extend circuits and causes one circuit to be energized while the other is de-energized. Normally closed limit switches LS5 and LS6 allow the sheet feed extend circuit to be energized only when the sheet feed mechanism is properly positioned and are operative to break the sheet feed extend circuit at the end of an extend stroke of the sheet feed mechanism.

A motor starter circuit 352, including overload switches 354 may also be connected across the conductors 320 and 322 for starting energization of the motor upon closing of the relay contact CR1. A counter circuit 356 is energized through closure of a contact CR1 and a counter reset circuit, which may provide counting pulses through closure of the normally opened limit switch LS1, may be reset through actuation of a counter reset switch 360.

Figure 11:
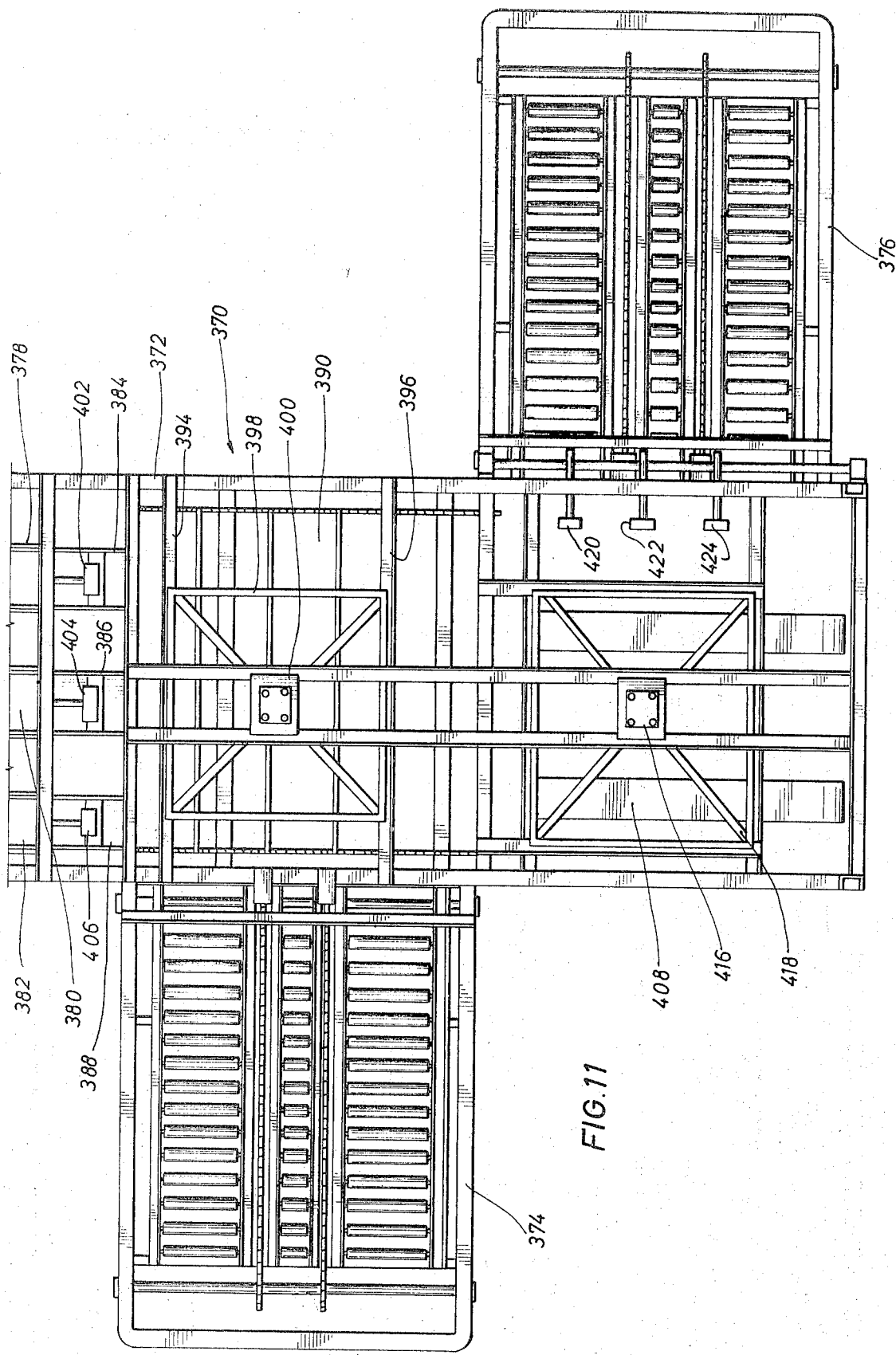
FIG. 11 is a plain view of a pallet manufacturing machine representing a modified embodiment of the present invention.

It may be desirable to provide a pallet making machine that is capable of manufacturing a "sandwich" type pallet having upper and lower pallet sheets disposed on either side of spacer blocks. If such is desired, a pallet making machine, capable of assembling pallet structures of this nature, may conveniently take the form illustrated generally at 370 in FIGS. 11 and 12. The machine may incorporate a framework 372 containing opposed sheet feeding mechanisms 374 and 376 which may be essentially identical to the sheet feeding section illustrated generally at 58 in FIG. 2 and may supply pallet sheets in the same manner as discussed above in connection with FIG. 2. A block feeding magazine including pallet block hoppers 378, 380 and 382 may be communicated with pallet block divide channels 384, 386 and 388 respectively for transportation of a plurality of pallet blocks in evenly distributed manner at a first assembly section 390 of the machine.

The upper pallet sheet 392 may be fed to support rails 394 and 396 at the assembly section and will be urged by a compression frame 398 downwardly by a fluid motor 400 into engagement with the pallet blocks. As the pallet blocks are transported to the first assembly section 390, adhesive heads 402, 404 and 406, constructed essentially identical with respect to adhesive heads illustrated in FIG. 2, 5 or 5a will apply an adhesive substance to the upper surface of the pallet blocks.

As the pallet blocks are being assembled to the upper pallet sheet at the first assembly section of the machine, the sheet conveyor mechanism 376 will convey the lower pallet sheet 410 to the second assembly section 408 of the machine for assembly to the upper pallet sheet and pallet block assembly which will have been conveyed by the pallet block conveyor mechanism to a pair of support rails 412 and 414 disposed substantially normal relative to the rails 394 and 396. A fluid motor 416 will then be energized and will move a compression frame 418 downwardly, thereby causing rails 412 and 414 to pivot to a release position, thereby releasing the upper pallet sheets and pallet block assembly and allowing the assembly to descend into contact with the lower pallet sheet 410.

Prior to movement of the lower pallet sheet 410 into the second assembly section of the machine, a plurality of adhesive heads 420, 422 and 424, pivotally connected to the framework of the machine, will be operative to coat portions of the upper surface of the lower pallet sheet 410 with an adhesive, which will cause the lower pallet sheet to be bonded to the upper pallet sheet and pallet block assembly upon being maintained under compression for a predetermined period of time. After the fluid motor 416 has been energized to retract the compression frame 418, the pallet assembly will be complete and it may be ejected by the pallet block conveyor mechanism onto a belt conveyor which may, for example, comprise a pair of endless belts 426 and 428 energized by a transverse shaft 430 with belt pulleys disposed thereon. The pallet block conveyor of the machine illustrated in FIGS. 11 and 12 may be a chain type conveyor assembly having flight bars connected thereto in essentially the same manner as shown at 152 and 168 in FIG. 1.

In view of the foregoing it is apparent that we have provided novel machine structures for manufacturing pallet assemblies of either the single pallet sheet or sandwich pallet configuration which pallets may be recycled, if desired, for protection of the environment from industrial waste. The pallets will contain no material that is not recyclable or readily disposable.

We have also provided novel pallet manufacturing machines that have the capability of manufacturing disposable or recyclable pallets with little or no manual labor involved in the manufacturing process. Pallet manufacturing machines, constructed in accordance with our invention, effectively achieve transportation of various components of the pallets being manufactured to a centrally located assembly section of the machine and maintaining the components in intimate compressed assembly for a predetermined period of time in the presence of an adhesive material that achieves permanent bonding of the parts into final pallet assembly. The adhesive material may be composed of any one of a number of commercially available adhesive substances that protect the environment from pollution.

By simple variation of the various feeding components of the machine and by variation in the assembly sections of the machine, pallets may be produced which are of the simple single sheet variety or which may comprise two or more pallet sheets that may be sandwiched about a plurality of pallet blocks depending upon the design criteria of the pallets and the ultimate structural integrity of the pallet structures desired. If the pallet structures should become damaged during transportation of palletized articles thereon, the pallet may be disposed of simply by any suitable recycling process. It is not necessary to expend manual labor in preparing the components of the pallet structures for recycling or ultimate disposal.

The pallet manufacturing machine of the present invention may include limit switch controlled electrical circuitry that will effectively cause the entire machine to be de-energized and shut down if the sheet feeding or pallet block conveying mechanisms of the invention fail to function properly or if the supply of pallet sheets or pallet blocks might have temporarily become exhausted.

In view of the foregoing, it is apparent that we have provided novel machines and method of manufacture for recyclable or disposable pallet structures that are well adapted to attain all of the objectives and advantages hereinabove set forth, together with other advantages, which will become obvious and inherent, from a description of the apparatus itself. It will be understood, that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters, hereinabove set forth or shown in the accompanying drawings, are to be interpreted as illustrative and not in any limiting sense.

What is claimed is:

1. A machine for manufacturing disposable, recyclable pallets comprising:
   a pallet sheet feed section adapted to retain a generally vertically oriented stack of pallet sheets disposed therein;
   a pallet assembly section being provided in said machine;
   a pair of spaced pallet sheet support rails being pivotally disposed at said pallet assembly section and being adapted to receive single pallet sheets from said pallet sheet feed section and to support said sheets in oriented spaced relation to the position of a plurality of spaced and oriented pallet blocks;
   means urging said pallet sheet support rails to a first position for support for said single pallet sheet and being pivotally yieldable to allow downward movement of said single pallet sheet;
   means for moving said single pallet sheet downward from said first position to a position in contact with said oriented pallet blocks;
   means passing beneath said pallet sheet feed section for conveying single pallet sheets from said pallet sheet feed section to said pallet sheet support rails;
   a pallet block magazine being provided on said machine and being adapted to receive a plurality of pallet blocks oriented in generally vertically stacked relation;
   conveyor means for transporting a plurality of pallet blocks from said pallet block magazine, said conveyor means passing adjacent said pallet block magazine and carrying spaced flight pusher means, said flight pusher means extracting blocks from said magazine and positioning the same in spaced relation relative to one another and in spaced and oriented relation to the position of a single pallet sheet on said pallet sheet rails;
   means for applying adhesive material to one surface of each of said pallet blocks as said pallet blocks are conveyed from said pallet block magazine;
   means at said pallet assembly section for moving said single pallet sheet from said pallet sheet support rails and said one surface of each of said pallet blocks into engagement and for applying mechanical pressure therebetween to cause adhesive material to adhere said pallet blocks to said pallet sheet and retracting from the completed pallet after said pallet blocks have been adhered to said pallet sheets; and
   means for conveying completed pallets from said pallet assembly section.

2. A machine as recited in claim 1 wherein said means for conveying single pallet sheets from said pallet sheet feed section comprises:
   pallet sheet pusher means adapted to engage only one of said pallet sheets of said stock of pallet sheets;
   means for controllably moving said pusher means from a starting position a predetermined distance in one direction to move said one pallet sheet from said stack and to position the same on said pallet sheet support rails; and
   means for repositioning said pusher means at said starting position for serial engagement with the next pallet sheet of said stock of pallet sheets.

3. A machine as recited in claim 1 wherein said pallet block magazine comprises:
   means for supporting said pallet blocks in a plurality of stacks;
   a plurality of pallet block guide channels extending one from each of said pallet block supporting means;
   said means for transporting said plurality of pallet blocks being an endless block conveyor;
   a plurality of flight pusher members being carried by said endless block conveyor, said flight pusher members each moving one block from each of said plurality of stacks of pallet blocks along respective ones of said pallet block guide channels upon being moved in one direction relative to said magazine; and means for stopping movement of said endless block conveyor and said flight pusher members upon movement of plurality of said blocks to predetermined positions at said pallet assembly section relative to the oriented position of a pallet sheet.

4. A machine as recited in claim 1 wherein said pallet magazine comprises:

a plurality of hoppers each being adapted to contain a stack of pallet blocks;

block moving conveyor means being carried by said machine adjacent said hoppers; and said flight pusher members being carried by said block moving conveyor means and each engaging a block from each of said hoppers upon movement thereof relative to said hoppers, thereby transporting a plurality of pallet blocks from said hoppers, said flight pusher members accomplishing said positioning of said pallet blocks at said pallet assembly section.

5. A machine as recited in claim 1, wherein said means for applying adhesive material to said pallet blocks comprises:

a plurality of adhesive heads being movably supported by said machine;

applicator head means being carried by each of said adhesive heads and being disposed for engagement by said pallet blocks upon movement thereof in said guide channel elements; and means for causing application of adhesive material to said blocks responsible to movement of said adhesive heads by said blocks.

6. A machine as recited in claim 2 wherein:

said pallet sheet pusher means comprises at least one pusher head having a pushing surface and a retracting surface formed thereon;

means urging said pusher head to a first position where said pushing surface is disposed for contact with a single pallet sheet; and said retracting surface engaging said stack of sheets upon movement of said pusher means in the opposite direction and moving said pusher means to a retracted position.

7. A machine as recited in claim 2 wherein:

said pallet sheet pusher means comprises endless conveyor means;

a plurality of pusher elements being carried by said conveyor means and being movable simultaneously with movement of said conveyor means;

a linear fluid motor being carried by said machine;

a rack and pinion mechanism being actuated by said fluid motor and imparting controlling rotary movement to said endless conveyor means; and said conveyor means being operable responsive to linear movement of said fluid motor means for imparting said selective pushing and retraction movement to said pusher means.

8. A machine as recited in claim 2 wherein:

said pallet sheet pusher means comprises at least one pusher head having a pushing surface at one extremity thereof and having a cam retraction surface defined at the opposite extremity thereof;

means urging said pusher head to a first position where said pushing surface is disposed for pushing contact with the lowermost one of said pallet sheets in said stack of pallet sheets;

means for imparting selective pushing and retraction movement to said pusher means; and said cam surface means engaging the lowermost one of said pallet sheets in said stack of pallet sheets and moving said pusher means to a retracted position where said pusher means may pass under said lowermost pallet sheet during said retraction movement.

9. A machine as recited in claim 5, wherein said block moving conveyor means comprises:

a plurality of block guide channel elements being carried by said machine and being positioned to receive pallet blocks from each of said hoppers;

a chain conveyor including a pair of simultaneously movable conveyor chains;

said flight pusher members being carried in generally parallel relation by said chain conveyor and engaging one pallet block from each stack of pallet blocks upon positioning movement of said chain conveyor and conveying said pallet blocks along said block guide channel elements; and means for imparting controlling movement to said chain conveyor.

10. A machine for manufacturing disposable recyclable pallets, said machine comprising:

a framework defining; a pallet sheet feed section, a pallet assembly section, a pallet block feed section, an adhesive application section, and an exit conveyor section;

a pallet stack support means being provided at said pallet sheet feed section and being adapted for support of a stack of pallet sheets;

a pair of spaced pallet sheet support rails being pivotally disposed at said pallet assembly section and being adapted to receive single pallet sheets from said pallet sheet feed section and to support said sheets in oriented spaced relation to the position of a plurality of spaced and oriented pallet blocks;

means for moving single pallet sheets from said pallet stack support means to said pallet sheet support rails;

means urging said pallet support rails to a first position for support of said single pallet sheet and being pivotally yieldable to allow downward movement of said single pallet sheet;

means for moving said single pallet sheet downward from said first position to a position in contact with said oriented pallet blocks;

a pallet block magazine for supporting a plurality of pallet blocks in a plurality of spaced stacks;

block conveyor means having a plurality of spaced flight pusher means carried thereby, said flight pusher means each moving one pallet block from each of said plurality of stacks of pallet blocks upon being moved in one direction relative to said magazine, said conveyor means positioning said pallet blocks relative to said single pallet sheet;

means for applying adhesive material to one surface of each of said pallet blocks;

means at said pallet assembly section for moving said single pallet sheet from said pallet sheet support rails and said one surface of each of said pallet blocks into engagement and applying mechanical pressure therebetween to cause said adhesive material to adhere said pallet blocks to said pallet sheet and retracting from the completed pallet after said pallet blocks have been adhered to said pallet sheets; and means for conveying completed pallets from said pallet assembly section.

11. A machine as recited in claim 10 wherein:

said framework defines a second assembly section;

second pallet sheet conveyor means being disposed adjacent said second assembly section and adapted to convey single sheets and to position the same at said second assembly section;

said block conveyor means moving said pallet sheet and pallet block assembly to said second assembly section;

means applying an adhesive substance to said second pallet sheet upon conveyance of said second pallet sheet to said second assembly section; and means for moving said second pallet sheet and said pallet sheet and pallet block assembly into engagement and maintaining the same under mechanical pressure for a predetermined period of time to cause said adhesive substance to adhere the same into permanently bonded assembly.

12. A machine for manufacturing disposable, recyclable pallets comprising:

a framework defining first and second assembly sections; a pallet sheet feed section for conveying single pallet sheets to said first assembly section;

a pallet block magazine being supported by said framework and having a plurality of hoppers each being adapted to contain a stack of pallet blocks;

means for conveying a plurality of pallet blocks in serial manner from each of said plurality of hoppers to said first assembly section and disposing the same in evenly distributed manner and in spaced relation to said single pallet sheet;

means for applying an adhesive substance to said pallet blocks as said blocks are conveyed from said hoppers;

means for moving said single pallet sheet to a pair of spaced pallet sheet support rails being pivotally disposed at said first pallet assembly section and being adapted to receive single pallet sheets from said pallet sheet feed section and to support said sheets in oriented spaced relation to the position of a plurality of spaced and oriented pallet blocks;

means urging said pallet sheet support rails to a first position for support of said single pallet sheet as being pivotally yieldable to allow downward movement of said single pallet sheet;

means for moving said single pallet sheet downward from said first position to a position in contact with said oriented pallet blocks and maintaining the same under mechanical pressure for a predetermined period of time to allow said adhesive substance to adhere said pallet sheet and pallet blocks into assembly;

means for conveying said pallet sheet and pallet block assembly to said second assembly section;

means for conveying a second pallet sheet to said assembly section and positioning the same in spaced and oriented relation to said pallet block assembly;

means for applying an adhesive substance to said second pallet sheet; and means for moving said second pallet sheet and said pallet sheet and pallet block assembly into engagement and maintaining the same under mechanical pressure for a predetermined period of time to cause said adhesive substance to adhere the same into permanently bonded assembly to form a pallet structure.

13. A machine as recited in claim 12:

said first and second assembly sections being disposed in spaced linear relation;

said means for conveying said plurality of pallet blocks also serving to convey said pallet sheet and pallet block assembly from said first assembly section to said second assembly section.

14. A machine as recited in claim 12:

pallet block magazine means being carried by said framework and containing a plurality of pallet blocks;

said means for conveying a plurality of pallet blocks to said first assembly section being a conveying mechanism having a plurality of flight bars disposed in spaced generally parallel relation thereon; said flight bars passing below said magazine upon energization of said conveyor mechanism and extracting said plurality of pallet blocks in serial manner from each of said hoppers and conveying the same to said first assembly section; and means for de-energizing said conveyor mechanism when said plurality of pallet blocks reach the proper position thereof relative to said first pallet section.

15. A machine as recited in claim 12:

said means for applying an adhesive substance to said pallet blocks including at least one adhesive head having an adhesive distributor carried thereby;

a compressed air energized adhesive supply system being supported by said framework and being connected to said adhesive head;

means for controlling ejection of adhesive substance from said adhesive distributor responsive to predetermined movement of said adhesive head; and said predetermined movement of said adhesive head being imparted to said adhesive head by a pallet block being conveyed by said conveying means.

16. A machine as recited in claim 12:

said means for moving said single pallet sheet and said means for conveying said second pallet sheet being generally identical sheet feeding mechanisms each being capable of conveying pallet sheets one at a time from a stack of pallet sheets to said first and second assembly sections, respectively.

17. A machine as recited in claim 12:

said means for conveying said single pallet sheets and for conveying said second pallet sheets each comprising conveyor mechanisms having at least one sheet pushing dog carried thereby and adapted to be reciprocated by said conveyor mechanism relative to a stack of pallet sheets contained thereby; and said pushing dog being movable between a pushing position where said pushing dog is disposed for pushing engagement with the lowermost pallet sheet of said stack of pallet sheets and a retracted position where said pushing dog is moved out of pushing engagement with said lowermost pallet sheet.

18. A machine as recited in claim 12:

said means for applying an adhesive substance to said pallet blocks including at least one adhesive head having an adhesive distributor carried thereby;

a source of adhesive substance including a pump cylinder having a pump piston movably disposed therein;

means for supplying adhesive substance to said pump cylinder;

a pump actuating mechanism interconnecting said pump piston and said adhesive head and actuating said pump piston responsive to movement of said adhesive head; and said adhesive head being moved by said pallet blocks being conveyed to said first assembly section by said conveying mechanism thereby causing adhesive substance to be deposited by said adhesive distributor on said blocks as the same are conveyed.

19. A machine as recited in claim 17:

said pushing dog being connected to a conveyor mechanism and having a pusher element movably disposed thereon, said pusher element having a pallet sheet engaging cam surface formed thereon and disposed for engagement with the lowermost sheet of said stack of pallet sheets and moving said pusher element to the retracted position thereof; and means for urging said pusher element to the pushing position thereof.

* * * * *